(12) United States Patent
Warntjes

(10) Patent No.: US 8,873,822 B2
(45) Date of Patent: Oct. 28, 2014

(54) METHODS AND APPARATUS FOR ESTIMATING CLINICAL MEASURES

(75) Inventor: Marcel Warntjes, Ljungsbro (SE)

(73) Assignee: SyntheticMR AB, Linköping (SE)

( * ) Notice: Subject to any disclaimer, the term of this patent is extended or adjusted under 35 U.S.C. 154(b) by 227 days.

(21) Appl. No.: 13/481,918

(22) Filed: May 28, 2012

(65) Prior Publication Data

US 2013/0315460 A1  Nov. 28, 2013

(51) Int. Cl.
*G06T 7/60* (2006.01)
*A61B 5/107* (2006.01)

(52) U.S. Cl.
USPC ............................................ 382/131; 382/286

(58) Field of Classification Search
None
See application file for complete search history.

(56) References Cited

U.S. PATENT DOCUMENTS

| | | | |
|---|---|---|---|
| 4,634,979 A | 1/1987 | Riederer et al. | |
| 4,641,095 A | 2/1987 | Riederer | |
| 4,881,033 A | 11/1989 | Denison et al. | |
| 5,262,945 A | 11/1993 | DeCarli et al. | |
| 5,425,368 A * | 6/1995 | Brandt ........................ | 600/408 |
| 5,486,763 A | 1/1996 | Alfano | |
| 6,366,797 B1 | 4/2002 | Fisher et al. | |
| 6,823,205 B1 | 11/2004 | Jara | |
| 6,917,199 B2 | 7/2005 | Jara | |
| 7,002,345 B2 | 2/2006 | Jara | |
| 7,973,530 B2 | 7/2011 | Warntjes | |
| 2003/0068074 A1* | 4/2003 | Hahn ........................... | 382/128 |
| 2006/0239519 A1* | 10/2006 | Nowinski et al. ............ | 382/128 |
| 2007/0167727 A1 | 7/2007 | Menezes et al. | |
| 2009/0267945 A1 | 10/2009 | Warntjes | |
| 2010/0103166 A1 | 4/2010 | Warntjes | |
| 2010/0127704 A1 | 5/2010 | Warntjes | |
| 2011/0018537 A1 | 1/2011 | Warntjes | |
| 2012/0197105 A1* | 8/2012 | Mezer et al. .................. | 600/410 |

OTHER PUBLICATIONS

Nair et al. "Quantitative Analysis of Brain Tissues from Magnetic Resonance Images." International Conference on Digital Image Processing, Mar. 7, 2009, pp. 57-61.*
Karsch et al. "Web Based Brain Volume Calculation for Magnetic Resonance Images." 30th Annual International Conference of the IEEE Engineering in Medicine and Biology Society, Aug. 20, 2008, pp. 1210-1213.*
R. Maitra et al., Bayesian Reconstruction in Synthetic Magnetic Resonance Imaging, Proc. SPIE, 1998, pp. 39-47, vol. 3459.
M. Prastawa et al., Synthetic Ground Truth for Validation of Brain Tumor MRI Segmentation, Med Image Comput Comput Assist Interv., 2005, pp. 26-33, 8 (Pt 1).
K.H. Cheng et al., In-vivo Tissue Characterization of Brain by Synthetic MR Proton Relaxation and Statistical Chisquares Parameter Maps, Proc. 8th Symposium on Computer-Based Medical Systems, 1995, pp. 338-345, IEEE.
M. Warntjes et al., Rapid Magnetic Resonance Quantification on the Brain: Optimization for Clinical Usage, Magnetic Resonance in Medicine, 2008, pp. 320-329, vol. 60, Wiley-Liss, Inc.
B. Grassiot et al., Quantification and Clinical Relevance of Brain Atrophy in Multiple Sclerosis: A Review, J. Neurol., 2009, pp. 1397-1412, vol. 256, Springer.
J. West et al., Novel Whole Brain Segmentation and Volume Estimation Using Quantitative MRI, Eur. Radiol., Nov. 24, 2011, pp. 1-10, Springer.

* cited by examiner

*Primary Examiner* — Jon Chang
(74) *Attorney, Agent, or Firm* — Piedmont Intellectual Property

(57) ABSTRACT

In a magnetic resonance imaging display system, the brain parenchymal fraction, a clinical measure for brain atrophy, is found by selection of white matter, grey matter, and/or cerebrospinal fluid based on quantitative magnetic resonance properties.

31 Claims, 3 Drawing Sheets

METHODS AND APPARATUS FOR ESTIMATING CLINICAL MEASURES

TECHNICAL FIELD

The present invention relates to a method, system and computer program product for generating clinical measures, in particular clinical brain measures.

BACKGROUND

Magnetic Resonance Imaging (MRI) can generate cross-sectional images in any plane (including oblique planes). Medical MRI most frequently relies on the relaxation properties of excited hydrogen nuclei (protons) in water and fat. When the object to be imaged is placed in a powerful, uniform magnetic field the spins of the atomic nuclei with non-integer spin numbers within the tissue all align either parallel to the magnetic field or anti-parallel. The output result of an MRI scan is an MRI contrast image or a series of MRI contrast images.

In order to understand MRI contrast, it is important to have some understanding of the time constants involved in relaxation processes that establish equilibrium following RF excitation. As the excited protons relax and realign, they emit energy at rates which are recorded to provide information about their environment. The realignment of proton spins with the magnetic field is termed longitudinal relaxation and the time (typically about 1 sec) required for a certain percentage of the tissue nuclei to realign is termed "Time 1" or T1. T2-weighted imaging relies upon local dephasing of spins following the application of the transverse energy pulse; the transverse relaxation time (typically <100 ms for tissue) is termed "Time 2" or T2. These relaxation times are also expressed as relaxation rates R1 (=1/T1) and R2 (=1/T2). The total signal depends on the number of protons, or proton density PD. On the scanner console all available parameters, such as echo time TE, repetition time TR, flip angle $\alpha$ and the application of preparation pulses (and many more), are set to certain values. Each specific set of parameters generates a particular signal intensity in the resulting images depending on the characteristics of the measured tissue.

Further, many neurological diseases, such as Alzheimer's disease and multiple sclerosis (MS), lead to brain atrophy, i.e., a loss of brain tissue volume in a faster rate than normal. It is important to monitor the brain volume evolution of these patients having such diseases to determine the severity of the disease and the impact of treatment. Generally the brain volume is normalized with the intracranial volume to minimize the effect of head size or incomplete acquisition coverage with the imaging modality. The ratio of the brain parenchymal volume (BPV) and the intracranial volume (ICV) is called the brain parenchymal fraction (BPF) and is considered a measure for brain atrophy (see, e.g., Grassiot B, et al. Quantification and clinical relevance of brain atrophy in multiple sclerosis: a review, J Neurol 2009; 256:1397-1412). To obtain the BPF manually is very time consuming and imprecise.

Further, U.S. Pat. No. 6,366,797 describes a method based on structure recognition and image thresholding in MR images. U.S. Pat. No. 5,262,945 describes a method that uses image intensity histograms of MR images, curve fitting and thresholding. These methods generate object recognition directly from MR images and hence require ad-hoc filtering and empirical image intensity thresholding. This is a challenge since any change in MR scanner settings or any unexpected imperfection in the acquisition changes the image intensity. Therefore the filtering and thresholding must be re-optimized for each MR image leading to an uncertain result.

It would therefore be desirable to provide improved methods and devises for obtaining clinical brain measures such as the brain parenchymal volume (BPV), the intracranial volume (ICV) and the brain parenchymal fraction (BPF).

SUMMARY

It is an object of the present invention to provide methods and devices to address at least parts of the problems outlined above.

This object and potentially others are obtained by the methods and devices as set out in the appended claims.

In accordance with embodiments described herein an automated method to estimate clinical measures such as the brain parenchymal volume (BPV), the intracranial volume (ICV) and the brain parenchymal fraction (BPF) based on quantitative magnetic resonance imaging (MRI) is provided.

In MRI there are three main physical properties that have an effect on signal intensity in the MR images: The longitudinal R1 relaxation rate (the inverse of the T1 relaxation time), the transverse R2 relaxation rate (the inverse of the T2 relaxation time) and the proton density PD. These three properties can be measured on with quantitative MRI. In contrast to conventional MR imaging, which results in qualitative images with a relative image intensity scale, a quantitative MRI scan results in the measurement of physical properties such as R1, R2 and PD on an absolute scale. These values are independent of scanner settings and hence directly reflect the underlying tissue. Thus, each tissue type has its own characteristic combination of R1, R2 and PD. For example the mean values for white matter in the brain are approximately (R1, R2, PD)=(1.7 $s^{-1}$, 14 $s^{-1}$, 64%), for grey matter (1.0 $s^{-1}$, 12 $s^{-1}$, 85%) and for cerebrospinal fluid (0.24 $s^{-1}$, 1.5 $s^{-1}$, 100%) (see, e.g., Warntjes et al., Rapid Magnetic Resonance Quantification on the Brain: Optimization for Clinical Usage, Magn Reson Med 2008; 60:320-329). Including noise of the measurement and partial volume effects, an area in the multi-parametric R1-R2-PD space can be specified to contain brain tissue and CSF. These values differ from for example muscle or fat.

In accordance with embodiments described herein a computerized method of estimating an intracranial volume ICV is provided. The method can comprise obtaining images of quantitative MR properties of the head, and based on the quantitative MR images selecting different tissues of the head. Then a mask including all pixels corresponding to the selected tissue types can be generated and a contiguous volume based on the generated mask can be formed. The contiguous volume can be used to estimate the ICV. In particular the ICV can be determined to be equal to the contiguous volume. In accordance with some embodiments WM is selected within the ICV based on the quantitative MR properties, to obtain the WM fraction as WM/ICV. In accordance with some embodiments GM is selected within the ICV based on the quantitative MR properties, to obtain the GM fraction as GM/ICV. In accordance with some embodiments brain parenchyma (BP) is selected within the ICV based on the quantitative MR properties, to obtain the BP fraction as BP/ICV. In accordance with some embodiments CSF is selected within the ICV based on quantitative MR properties, to obtain the CSF fraction as CSF/ICV. In accordance with some embodiments WM, GM and CSF are selected within the ICV based on the quantitative MR properties, to obtain the remaining non-recognize fraction NF as (ICV-WM-GM- CSF)/ICV. In accordance with some embodiments WM and GM are selected within the ICV based on the quantitative MR properties, to obtain the WGR as WM/GM.

In accordance with one embodiment the selected different tissues comprises white matter, WM, and grey matter, GM and CSF. In particular the selected different tissue types are selected to be only WM, GM and CSF.

In accordance with some embodiments the MR properties correspond to at least one of R1 and R2 relaxation rate or proton density, or relaxation time, where T1=1/R1 and T2=1/R2.

In accordance with some embodiments a region growing algorithm is used to select the largest contiguous ICV volume in a dataset to exclude false positives outside the ICV and to include false negatives inside the ICV.

In accordance with some embodiments the edge of the selected ICV is refined by using a threshold of PD=50% for inclusion of pixels at the edge of the ICV.

In accordance with some embodiments CSF is selected within the ICV based on quantitative MR properties, to obtain the BPV as ICV-CSF. The BPF can be determined as BPV/ICV. In accordance with some embodiments WM is selected within the BPV based on the quantitative MR properties, to obtain the WMBF as WM/BPV. In accordance with some embodiments GM is selected within the BPV based on the quantitative MR properties, to obtain the GMBF as GM/BPV.

The invention also extends to a computerized imaging system arranged to perform the methods as described herein and also to a digital storage medium having stored thereon computer program instructions/software segments that when executed by a computer causes a computer to execute the methods as described herein.

Among the advantages of the methods described herein is that an objective measure for BPV, ICV and BPF can be provided, based on an absolute measurement and without user interference.

BRIEF DESCRIPTION OF THE DRAWINGS

The present invention will now be described in more detail by way of non-limiting examples and with reference to the accompanying drawings, in which.

DETAILED DESCRIPTION

In the following description, for purposes of explanation and not limitation, specific details are set forth such as particular architectures, interfaces, techniques, etc. However, it will be apparent to those skilled in the art that the described technology may be practiced in other embodiments that depart from these specific details. That is, those skilled in the art will be able to devise various arrangements which, although not explicitly described or shown herein, embody the principles of the described technology. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional may be provided through the use of dedicated hardware as well as hardware capable of executing software. When a computer processor is used, the functions may be provided by a single dedicated processor, by a single shared processor, or by a plurality of individual processors, some of which may be shared or distributed. Moreover, a controller as described herein may include, without limitation, digital signal processor (DSP) hardware, ASIC hardware, read only memory (ROM), random access memory (RAM), and/or other storage media.

Figure 1:
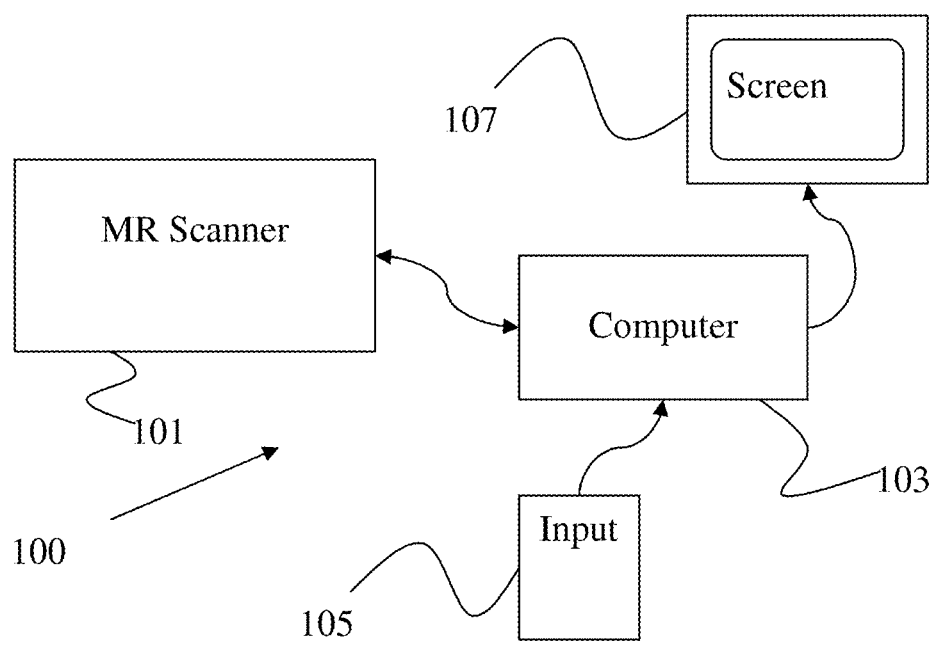
FIG. 1 is a schematic outline of an MR system.

In FIG. 1 a general view of a setup of a MRI system 100 is depicted. The system 100 comprises a MR scanner 101. The MR scanner is operative to generate MRI data by means of scanning a living object. The MR scanner is further connected to a computer 103 for processing data generated by the scanner 101. The computer comprises a central processor unit coupled to a memory and a number of input and output ports for receiving and outputting data and information. The computer 103 receives input commands from one or several input devices generally represented by an input device 105. The input device may be one or many of a computer mouse, a keyboard, a track ball or any other input device. The computer 103 is further connected to a screen 107 for visualizing the processed scanner data as a contrast image. In particular the computer 103 can comprise controller unit(s)/imaging circuitry arranged to perform methods as described herein.

Figure 3:
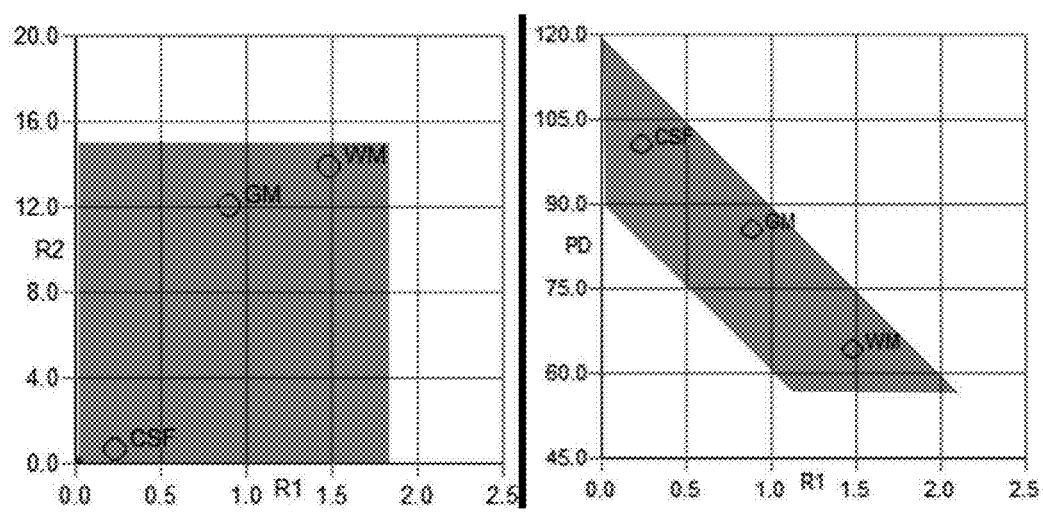
FIG. 3 is an example of inclusion criteria of the quantitative magnetic resonance properties R1 relaxation rate, R2 relaxation rate and proton density PD for white matter (WM), grey matter (GM) and cerebrospinal fluid (CSF) in the ICV.

In MRI there are three main physical properties that have an effect on signal intensity in the MR images: The longitudinal R1 relaxation rate (the inverse of the T1 relaxation time), the transverse R2 relaxation rate (the inverse of the T2 relaxation time) and the proton density PD. These three properties can be measured on an absolute scale with quantitative MRI. Each tissue has its own characteristic combination of R1, R2 and PD. For example the mean values for white matter in the brain are approximately (R1, R2, PD)=(1.7 s$^{-1}$, 14 s$^{-1}$, 64%), for grey matter (1.0 s$^{-1}$, 12 s$^{-1}$, 85%) and for cerebrospinal fluid (0.24 s$^{-1}$, 1.5 s$^{-1}$, 100%) (see, e.g., Warntjes et al., Rapid Magnetic Resonance Quantification on the Brain: Optimization for Clinical Usage, Magn Reson Med 2008; 60:320-329). Including noise of the measurement and partial volume effects, an area in the multi-parametric R1-R2-PD space can be specified to contain brain tissue and CSF, see FIG. 3. These values differ from for example muscle or fat.

Figure 2:
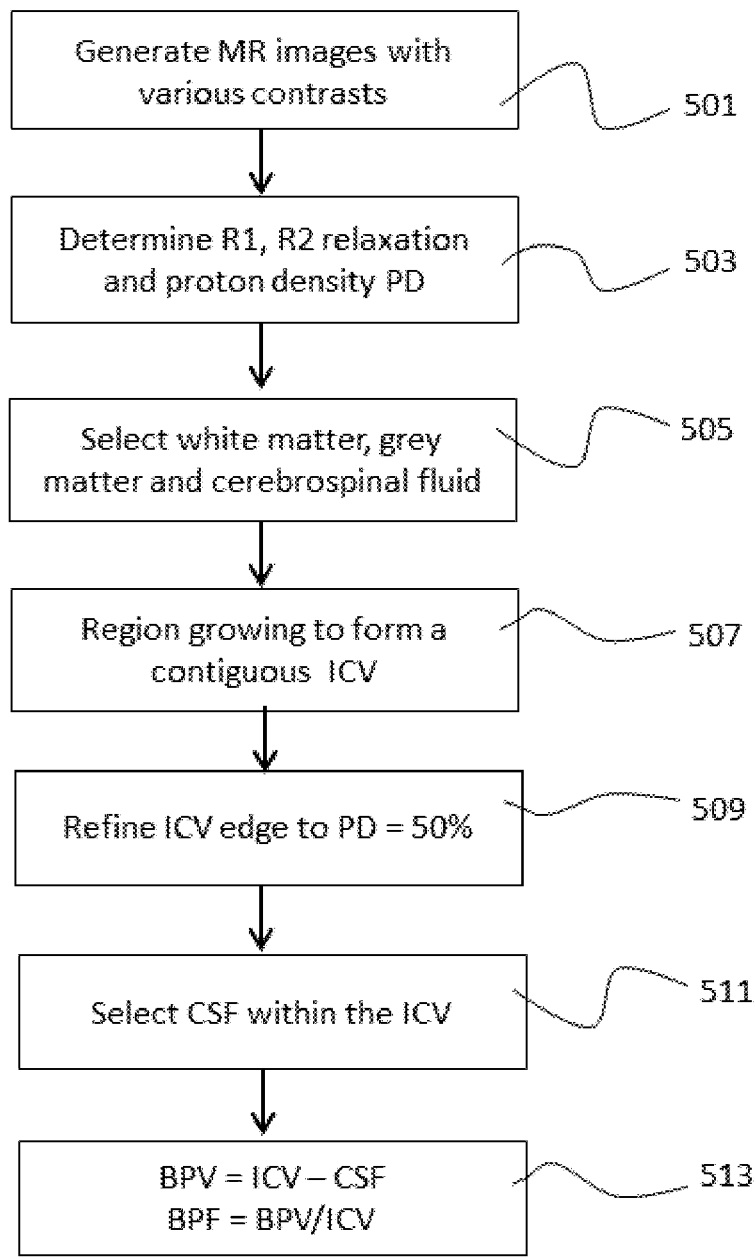
FIG. 2 is a flowchart illustrating steps performed to obtain the intracranial volume (ICV) and the Brain Parenchymal Fraction (BPF).

In FIG. 2, a flow chart illustrating steps performed when generating a BPF. First, in a step 501, a set of MR images with different contrast settings of a sample is obtained. This can typically be performed using a Magnetic resonance (MR) scanner. Next, in a step 503, some physical properties of the imaged sample are determined. Typically R1, R2 and PD are estimated. This can for example be performed using the method described by Warntjes et al., Rapid Magnetic Resonance Quantification on the Brain: Optimization for Clinical Usage, Magn Reson Med 2008; 60:320-329. The result is quantitative MR maps of R1, R2 and PD. These are different than conventional MR images such as for example the T2-weighted MR image shown in FIG. 4a. Next, in a step 505 using a selection of the obtained physical properties different pixels of the imaged sample are assigned to different tissue types. For example using a selection of obtained R1, R2 and PD values, for example according to FIG. 3, a number of pixels in the data can be assigned to contain With Matter (WM), Grey Matter (GM) and cerebrospinal fluid (CSF) or a mixture of these tissues. All selected pixels form a mask with potential ICV, see FIG. 4b. Generally this initial mask display holes where tissue fall outside the selection, e.g. at blood vessels and heavily myelinated WM. It may also include small parts outside the ICV, for example consisting of partial volume muscle and fat.

Next, in a step 507 a contiguous ICV mask is formed containing the largest interconnected volume of the initial mask. The ICV mask defines the boundaries of the ICV and thereby the ICV. This can for example be obtained by applying a region growing algorithm to the initial mask, which then will result in a contiguous ICV mask. This can be done by starting a seed area centrally in the head, see FIG. 4c, and growing this mask outwards while limited by the initial ICV mask. This way only the central part of the mask remains removing the small parts outside the ICV. Subsequently region growing can be started from the corners of the images and growing inwards while limited by the initial ICV mask. This way the holes inside the ICV are removed. The double region growing results in a contiguous ICV mask, see FIG. 4d.

In step 509 the ICV mask can be further refined if deemed necessary by improving the edge of the ICV mask. As for now different tissue types such as WM, GM and CSF were included. The actual ICV edge, however, is between CSF and the skull bone. This implies a threshold at PD=50%, since CSF has PD=100% and bone has PD=0%. The pixels at the edge can then be recalculated with this requirement only.

Figure 4:
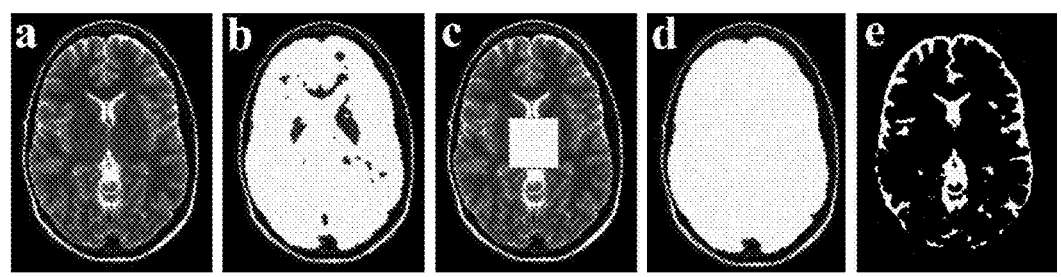
FIG. 4 illustrates ICV and BPF segmentation for an axial slice of the brain.

Next, in a step 511, using a selection criteria for CSF, the pixels containing CSF within the ICV mask are marked, see FIG. 4e. This can be done using a hard threshold where either CSF exists or not, or a partial volume model is applied where the probability of CSF is calculated for each pixel within the ICV mask, for example according to the model described in West et al. Novel whole brain segmentation and volume estimation using quantitative MRI. Eur Radiol. 2011; Nov. 24.

Then, in a step 513, the BPV can be calculated as ICV minus CSF and the BPF can be calculated as BPV divided by ICV.

Other potential clinical measures can be found using the same method. For example using selection criteria for WM the pixels containing WM within the ICV mask can be marked to find the white matter fraction (WMF=WM/ICV), using selection criteria for GM the pixels containing GM within the ICV mask can be marked to find the grey matter fraction (GMF=GM/ICV) and using selection criteria for CSF the pixels containing CSF within the ICV mask can be marked to find the cerebrospinal fluid fraction (CSFF=CSF/ICV).

The region growing algorithm of the ICV can lead to inclusion of tissue that does not match the selection criteria for WM, GM or CSF, and can be called Non-WM/GM/CSF. This tissue has a high probability to comprise pathological tissue and hence forms an interesting clinical measure. This fraction can be calculated as NF=(ICV−WM−GM−CSF)/ICV. Furthermore using selection criteria for WM and GM the pixels containing WM and GM within the ICV mask can be marked to find the white matter to grey matter ratio (WGR).

Also, clinical measures can be found for tissue which is normalized using the brain parenchymal volume BPV rather than the intracranial volume ICV: using selection criteria for WM and for BPV the pixels containing WM within the BPV can be marked to find the white matter brain fraction (WMBF=WM/BPV) and using selection criteria for GM and for BPV the pixels containing GM within the BPV can be marked to find the grey matter brain fraction (GMBF=GM/BPV). In accordance with some embodiments brain parenchyma (BP) is selected within the ICV based on the quantitative MR properties, to obtain the BP fraction as BP/ICV.

All of the steps described in conjunction with FIG. 2 can be implemented in a computer by, for example but not limited to, executing suitable software program loaded into the computer on a digital storage media and causing the computer to execute the above steps. The method can also be implemented using suitable hardware comprising suitable image circuitry and controllers in combination with different models and memories, for example in the form of look-up tables.

What is claimed is:

1. A computerized method of estimating an intracranial volume (ICV) of a head, the method comprising:
   obtaining images of quantitative magnetic resonance (MR) properties of the head,
   based on the images, selecting different tissues of the head,
   generating a mask including all pixels corresponding to types of the selected tissues,
   based on the generated mask, forming a contiguous volume, and
   estimating the ICV using the contiguous volume;
   wherein the quantitative MR properties correspond to at least one of R1 and R2 relaxation rate or proton density, or relaxation time, where T1=1/R1 and T2=1/R2.

2. The method of claim 1, wherein the selected different tissues comprises white matter (WM), and grey matter (GM) and cerebrospinal fluid (CSF).

3. The method of claim 2, wherein the selected different tissue types are only WM, GM and CSF.

4. The method of claim 1, wherein a region-growing algorithm selects the largest contiguous ICV volume in a dataset to exclude false positives outside the ICV and to include false negatives inside the ICV.

5. The method of claim 4, wherein an edge of the selected ICV is refined by using a threshold of proton density (PD)=50% for inclusion of pixels at the edge of the ICV.

6. The method of claim 1, wherein cerebrospinal fluid (CSF) is selected within the ICV based on quantitative MR properties, to obtain a brain parenchymal volume (BPV) as ICV−CSF.

7. The method of claim 6, wherein a brain parenchymal fraction (BPF) is determined as BPV/ICV.

8. The method of claim 6, wherein white matter (WM) is selected within the BPV based on the quantitative MR properties, to obtain a white matter brain fraction (WMBF) as WM/BPV.

9. The method of claim 6, wherein grey matter (GM) is selected within the BPV based on the quantitative MR properties, to obtain a grey matter brain fraction (GMBF) as GM/BPV.

10. The method of claim 1, wherein white matter (WM) is selected within the ICV based on the quantitative MR properties, to obtain a white matter fraction (WMF) as WM/ICV.

11. The method of claim 1, wherein grey matter (GM) is selected within the ICV based on the quantitative MR properties, to obtain a grey matter fraction (GMF) as GM/ICV.

12. The method of claim 1, wherein cerebrospinal fluid (CSF) is selected within the ICV based on quantitative MR properties, to obtain a cerebrospinal fluid fraction (CSFF) as CSF/ICV.

13. The method of claim 1, wherein white matter (WM), grey matter (GM), and cerebrospinal fluid (CSF) are selected within the ICV based on the quantitative MR properties, to obtain a remaining non-recognize fraction (NF) as (ICV−WM−GM−CSF)/ICV.

14. The method of claim 1, wherein white matter (WM) and grey matter (GM) are selected within the ICV based on the quantitative MR properties, to obtain a white/grey ratio (WGR) as WM/GM.

15. A device for computerized estimation of an intracranial volume (ICV) of a head, the device comprising:
an electronic processor and memory configured for obtaining images of quantitative magnetic resonance (MR) properties of the head, for selecting different tissues of the head based on the images, for generating a mask including all pixels corresponding to the selected tissue types, for forming a contiguous volume based on the generated mask, and for estimating the ICV using the contiguous volume;
wherein the quantitative MR properties correspond to at least one of R1 and R2 relaxation rate or proton density, or relaxation time, where T1=1/R1 and T2=1/R2.

16. The device of claim 15, wherein the selected different tissues include white matter (WM), grey matter (GM), and cerebrospinal fluid (CSF).

17. The device of claim 16, wherein the selected different tissue types are only WM, GM, and CSF.

18. The device of claim 16, wherein the electronic processor and memory is further configured for selecting WM, GM and CSF within the ICV based on the quantitative MR properties, and for obtaining a remaining non-recognized fraction (NF) as (ICV−WM−GM−CSF)/ICV.

19. The device of claim 15, wherein the electronic processor and memory is further configured for applying a region-growing algorithm configured to select a largest contiguous ICV volume in a dataset to exclude false positives outside the ICV and to include false negatives inside the ICV.

20. The device of claim 15, wherein the electronic processor and memory is further configured for refining an edge of the selected ICV by using a threshold of proton density (PD)=50% for inclusion of pixels at the edge of the ICV.

21. The device of claim 15, wherein the electronic processor and memory is further configured for selecting cerebrospinal fluid (CSF) within the ICV based on quantitative MR properties, and for obtaining a brain parenchymal volume (BPV) as ICV−CSF.

22. The device of claim 21, wherein the device is configured to determine a brain parenchymal fraction (BPF) as BPV/ICV.

23. The device of claim 22, wherein the electronic processor and memory is further configured for selecting white matter (WM) within the BPV based on the quantitative MR properties, and for obtaining a white matter brain fraction (WMBF) as WM/BPV.

24. The device of claim 22, wherein the electronic processor and memory is further configured for selecting grey matter (GM) within the BPV based on the quantitative MR properties, and for obtaining a grey matter brain fraction (GMBF) as GM/BPV.

25. The device of claim 15, wherein the electronic processor and memory is further configured for selecting white matter (WM) within the ICV based on the quantitative MR properties, and for obtaining a white matter fraction (WMF) as WM/ICV.

26. The device of claim 15, wherein the electronic processor and memory is further configured for selecting grey matter (GM) within the ICV based on the quantitative MR properties, and for obtaining a grey matter fraction (GMF) as GM/ICV.

27. The device of claim 15, wherein the electronic processor and memory is further configured for selecting cerebrospinal fluid (CSF) within the ICV based on quantitative MR properties, and for obtaining a cerebrospinal fluid fraction (CSFF) as CSF/ICV.

28. The device of claim 15, wherein the electronic processor and memory is further configured for selecting white matter (WM) and grey matter (GM) within the ICV based on the quantitative MR properties, and for obtaining a white/grey ratio (WGR) as WM/GM.

29. A non-transitory digital storage medium having stored thereon computer program instructions that when executed by a computer causes the computer to perform the steps of:
obtaining images of quantitative magnetic resonance (MR) properties of a head,
based on the images, selecting different tissues of the head,
generating a mask including all pixels corresponding to types of the selected tissue,
based on the generated mask, forming a contiguous volume, and
estimating an intracranial volume (ICV) of the head using the contiguous volume;
wherein the quantitative MR properties correspond to at least one of R1 and R2 relaxation rate or proton density, or relaxation time, where T1=1/R1 and T2=1/R2.

30. A computerized method of estimating an intracranial volume (ICV) of a head, the method comprising:
obtaining images of quantitative magnetic resonance (MR) properties of the head;
based on the images, selecting different tissues of the head;
generating a mask including all pixels corresponding to types of the selected tissues;
based on the generated mask, forming a contiguous volume; and
estimating the ICV using the contiguous volume;
wherein a region-growing algorithm selects the largest contiguous ICV volume in a dataset to exclude false positives outside the ICV and to include false negatives inside the ICV; and an edge of the selected ICV is refined by using a threshold of proton density (PD)=50% for inclusion of pixels at the edge of the ICV.

31. A device for computerized estimation of an intracranial volume (ICV) of a head, the device comprising:
an electronic processor and memory configured for obtaining images of quantitative magnetic resonance (MR) properties of the head, for selecting different tissues of the head based on the images, for generating a mask including all pixels corresponding to the selected tissue types, for forming a contiguous volume based on the generated mask, and for estimating the ICV using the contiguous volume;
wherein the electronic processor and memory is further configured for refining an edge of the selected ICV by using a threshold of proton density (PD)=50% for inclusion of pixels at the edge of the ICV.

* * * * *